United States Patent
Maes (10) Patent No.: US 9,535,769 B2
(45) Date of Patent: Jan. 3, 2017

(54) ORCHESTRATED DATA EXCHANGE AND SYNCHRONIZATION BETWEEN DATA REPOSITORIES

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 513 days.

(21) Appl. No.: 13/022,002

(22) Filed: Feb. 7, 2011

(65) Prior Publication Data

US 2011/0196824 A1   Aug. 11, 2011

Related U.S. Application Data

(60) Provisional application No. 61/301,831, filed on Feb. 5, 2010.

(51) Int. Cl.
| | |
|---|---|
| *G06F 7/00* | (2006.01) |
| *G06F 17/30* | (2006.01) |
| *G06F 9/54* | (2006.01) |
| *H04L 12/18* | (2006.01) |
| *H04L 29/08* | (2006.01) |

(52) U.S. Cl.
CPC ........... *G06F 9/54* (2013.01); *G06F 17/30174* (2013.01); *H04L 12/18* (2013.01); *H04L 67/1095* (2013.01)

(58) Field of Classification Search
CPC .... G06F 17/30943; G06F 15/16; H01L 12/18; H01L 12/1836; H01L 12/1859
USPC .................. 707/609, 610, 705; 709/206, 227
See application file for complete search history.

(56) References Cited

U.S. PATENT DOCUMENTS

| | | | |
|---|---|---|---|
| 7,720,918 B1 * | 5/2010 | Martin et al. ................ | 709/206 |
| 2007/0226231 A1 * | 9/2007 | Venkat ......................... | 707/100 |
| 2008/0077635 A1 * | 3/2008 | Sporny et al. ............... | 707/204 |

* cited by examiner

*Primary Examiner* — Marc Somers
(74) *Attorney, Agent, or Firm* — Kilpatrick Townsend & Stockton LLP (57) ABSTRACT

Embodiments of the invention provide systems and methods for providing efficient Service Oriented Architecture (SOA) orchestrated data exchanges and synchronizations between a plurality of databases or other repositories. According to one embodiment, a method of exchanging data between a plurality of data repositories can comprise distinguishing instructions to perform a data exchange from data of the data exchange. The instructions to perform the data exchange can be exchanged via an Enterprise Service Bus (ESB) of a Service Oriented Architecture (SOA) and the data of the data exchange between two or more of the plurality of data repositories can be exchanged via a channel other than the ESB. The data exchange can be orchestrated by orchestrating the instructions to perform the data exchange.

17 Claims, 6 Drawing Sheets

ORCHESTRATED DATA EXCHANGE AND SYNCHRONIZATION BETWEEN DATA REPOSITORIES

CROSS-REFERENCES TO RELATED APPLICATIONS

The present application claims benefit under 35 USC 119(e) of U.S. Provisional Application No. 61/301,831, filed on Feb. 5, 2010 by Maes and entitled "Orchestrated Data Exchange and Synchronization Between Data Repositories," of which the entire disclosure is incorporated herein by reference for all purposes.

BACKGROUND OF THE INVENTION

Embodiments of the present invention relate generally to methods and systems for managing data in a plurality of data repositories and more particularly to providing efficient Service Oriented Architecture (SOA) orchestrated data exchanges and synchronizations between a plurality of databases or other repositories.

Today many systems have evolved towards SOA. In particular, these systems rely on SOA to integrate complex applications such as various enterprise applications. Examples of such integrations are represented in resulting industry patterns like Application Integration Architecture (AIA) and common architectures like various Enterprise Application Integration (EAI) and Enterprise Resource Planning (ERP) architectures. These examples illustrate the different approaches to SOA integration systems.

However, such systems have implemented EAI or ERP integration where all the data exchanges are passing via the Enterprise Service Bus (ESB) of the SOA. A result of such implementations is that performances and delays are abysmal compared to non-web service based synchronizations. Alternatively, buses different from ESB which may be implemented in SOA are expected to perform better but remain unproven. Hence, there is a need for improved methods and systems for managing data in a plurality of data repositories.

BRIEF SUMMARY OF THE INVENTION

Embodiments of the invention provide systems and methods for providing efficient Service Oriented Architecture (SOA) orchestrated data exchanges and synchronizations between a plurality of databases or other repositories. According to one embodiment, a method of exchanging data between a plurality of data repositories can comprise distinguishing instructions to perform a data exchange from data of the data exchange. The instructions to perform the data exchange can be exchanged via an Enterprise Service Bus (ESB) or other Message Oriented Middleware (MOM), message broker, or Event Driven Architecture (EDA) of a Service Oriented Architecture (SOA) and the data of the data exchange between two or more of the plurality of data repositories can be exchanged via a channel other than the ESB. The data exchange can be orchestrated by orchestrating the instructions to perform the data exchange.

Distinguishing the instructions to perform the data exchange from the data of the data exchange can further comprise determining whether the data exchange can be performed by a source of the data. In response to determining the data exchange can be performed by the source of the data, the data exchange from the source of the data to a target of the data exchange can be performed via a channel other than the ESB. In some cases, distinguishing the instructions to perform the data exchange from the data of the data exchange can further comprise identifying information indicating a target of the data exchange. In such cases, exchanging the instructions to perform the data exchange via the ESB, MOM, or EDA can comprise exchanging only the information indicating the target of the data exchange.

The plurality of data repositories can comprise, for example, a plurality of databases. In such cases, exchanging the data of the data exchange between two or more of the plurality of data repositories comprises performing a database to database exchange. The channel other than the ESB can comprise, for example, a hardware bus between each of the plurality of data repositories. In some cases, exchanging the data of the data exchange between two of more of the plurality of data repositories can comprise exchanging the data of the data exchange using a broadcast or a multicast.

According to another embodiment, a system can comprise an Enterprise Service Bus (ESB) or other Message Oriented Middleware (MOM), message broker, or Event Driven Architecture (EDA) of a Service Oriented Architecture (SOA), a communication channel other than the ESB, a first data repository communicatively coupled with the ESB and the communication channel, and a second data repository communicatively coupled with the ESB and the communication channel. The first and second data repositories can be adapted to distinguish instructions to perform a data exchange from data of the data exchange, exchange the instructions to perform the data exchange via an Enterprise Service Bus (ESB) or other Message Oriented Middleware (MOM), message broker, or Event Driven Architecture (EDA) of a Service Oriented Architecture (SOA), and exchange the data of the data exchange between two or more of the plurality of data repositories via the communication channel. The system can also include an orchestrator communicatively coupled with the ESB. The orchestrator can be adapted to orchestrate the data exchange by orchestrating the instructions to perform the data exchange.

For example, the first data repository can comprise a source of the data exchange. In such a case, the first data repository can be adapted to determine whether the data exchange can be performed between the first data repository and second data repository. The first data repository can be further adapted to perform the data exchange with the second data repository via the communication channel in response to determining the data exchange can be performed between the first data repository and the second data repository. In some cases, distinguishing the instructions to perform the data exchange from the data of the data exchange can further comprise identifying information indicating a target of the data exchange. In such cases, exchanging the instructions to perform the data exchange via the ESB can comprise exchanging only the information indicating the target of the data exchange.

The plurality of data repositories can comprise, for example, a plurality of databases. In such a case, exchanging the data of the data exchange between two or more of the plurality of data repositories comprises performing a database to database exchange. The communication channel can comprise a hardware bus. In this or other cases, exchanging the data of the data exchange between two of more of the plurality of data repositories comprises exchanging the data of the data exchange using a broadcast or a multicast. In some cases, the system can further comprise at least one application communicatively coupled with the ESB. The at least one application can participate in the data exchange based on the instructions to perform the data exchange.

According to yet another embodiment, a machine readable medium can have stored thereon a series of instructions which, when executed by a processor, cause the processor to exchange data between a plurality of data repositories by distinguishing instructions to perform a data exchange from data of the data exchange. The instructions to perform the data exchange can be exchanged via an Enterprise Service Bus (ESB) or other Message Oriented Middleware (MOM), message broker, or Event Driven Architecture (EDA) of a Service Oriented Architecture (SOA) and the data of the data exchange between two or more of the plurality of data repositories can be exchanged via a channel other than the ESB.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing data exchanges and synchronizations between a plurality of databases or other repositories. More specifically, embodiments of the present invention provide for providing efficient Service Oriented Architecture (SOA) orchestrated data exchanges and synchronizations between a plurality of databases or other repositories. According to embodiments of the present invention, instead of putting all the data to be exchanged on the ESB, the instructions to perform the exchange are put on the EBS and the data exchanges are performed between involved repostories. That is, manipulations of the data of an exchange are orchestrated via SOA (e.g exchanged on the bus) but resulting data exchanges are done between involved repositories on a communication channel separate/different from the ESB. Further, the instructions to perform data exchanges or manipulations can be orchestrated and exchanged via the ESB. The resulting data exchanges can be done between the repositories using broadcast, multicast, unicast, and other means to exchange data via one or more channels other than the ESB.

Stated another way, exchanging data between a plurality of data repositories can comprise distinguishing instructions to perform a data exchange from data of the data exchange. The instructions to perform the data exchange can be exchanged via an Enterprise Service Bus (ESB) or other Message Oriented Middleware (MOM), message broker, or Event Driven Architecture (EDA) of a Service Oriented Architecture (SOA) and the data of the data exchange between two or more of the plurality of data repositories can be exchanged via a channel other than the ESB. The data exchange can be orchestrated by orchestrating the instructions to perform the data exchange.

In some cases, for example when a record by record or larger units of data are to be exchanged, a determination can be made as to whether the exchange can be performed by the source and/or the target. If so, the source can then explicitly send the exchange to the target(s) via channels other than the ESB. Again in this case, records that other entities, i.e., other than the source and target repositories, should examine and consider can be sent on the ESB but other data is exchanged between the repositories via another channel. In some cases, especially if larger sets of data are determined to be sent to other entities via the ESB, the information sent can be further limited to that data useful to determine the target of the exchange. Then, the interested parties can make a request for the data either via ESB or via the data channel and exchange data via the data channels.

In other words, distinguishing the instructions to perform the data exchange from the data of the data exchange can further comprise determining whether the data exchange can be performed by a source of the data. In response to determining the data exchange can be performed by the source and/or the target of the data, the data exchange from the source of the data to a target of the data exchange can be performed via a channel other than the ESB. In some cases, distinguishing the instructions to perform the data exchange from the data of the data exchange can further comprise identifying information indicating a target of the data exchange. In such cases, exchanging the instructions to perform the data exchange via the ESB can comprise exchanging only the information indicating the target of the data exchange. Various additional details of embodiments of the present invention will be described below with reference to the figures.

Figure 1:
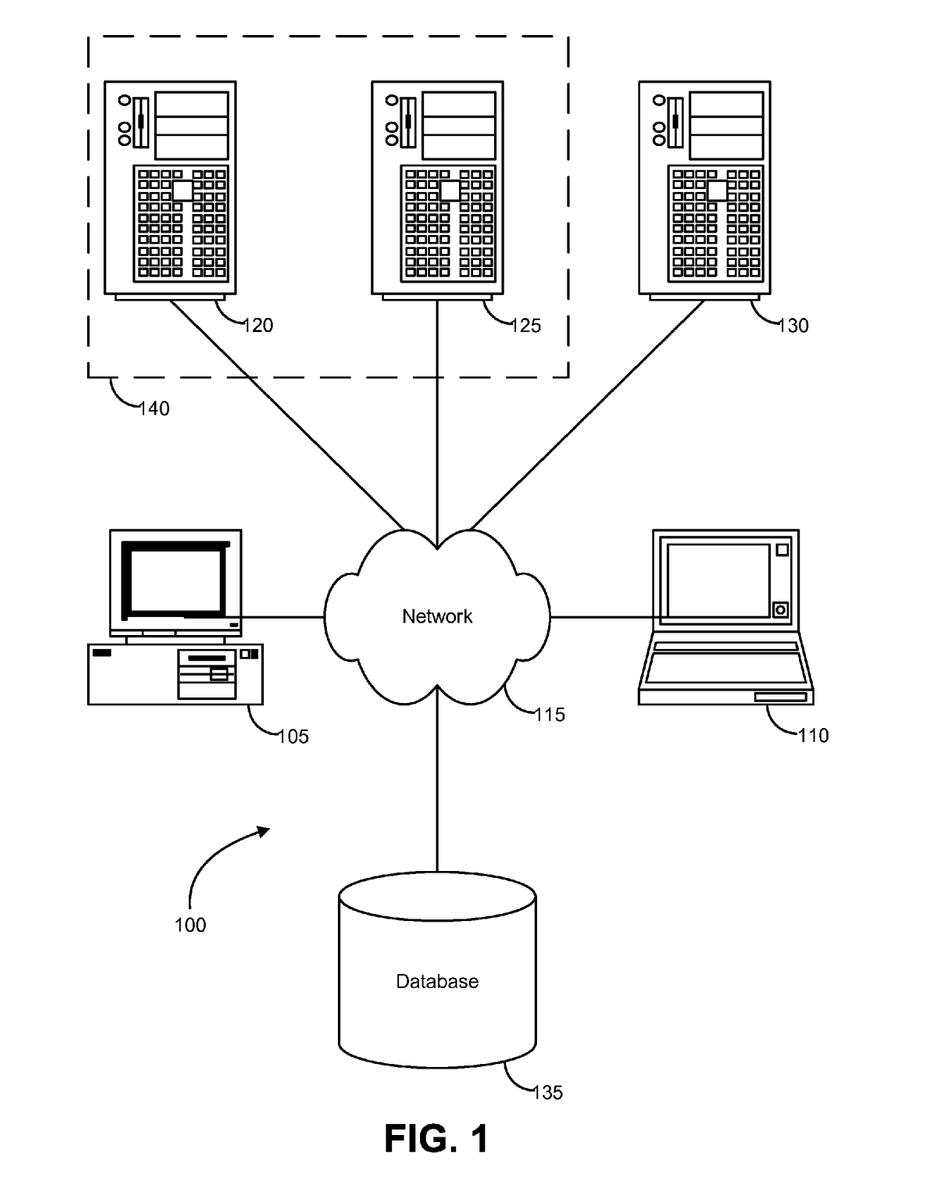
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft® Corp.'s Windows® and/or Apple® Corp.'s Macintosh® operating systems) and/or workstation computers running any of a variety of commercially-available UNIX® or UNIX-like operating systems (including without limitation, the variety of GNU/Linux® operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk®, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth® protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
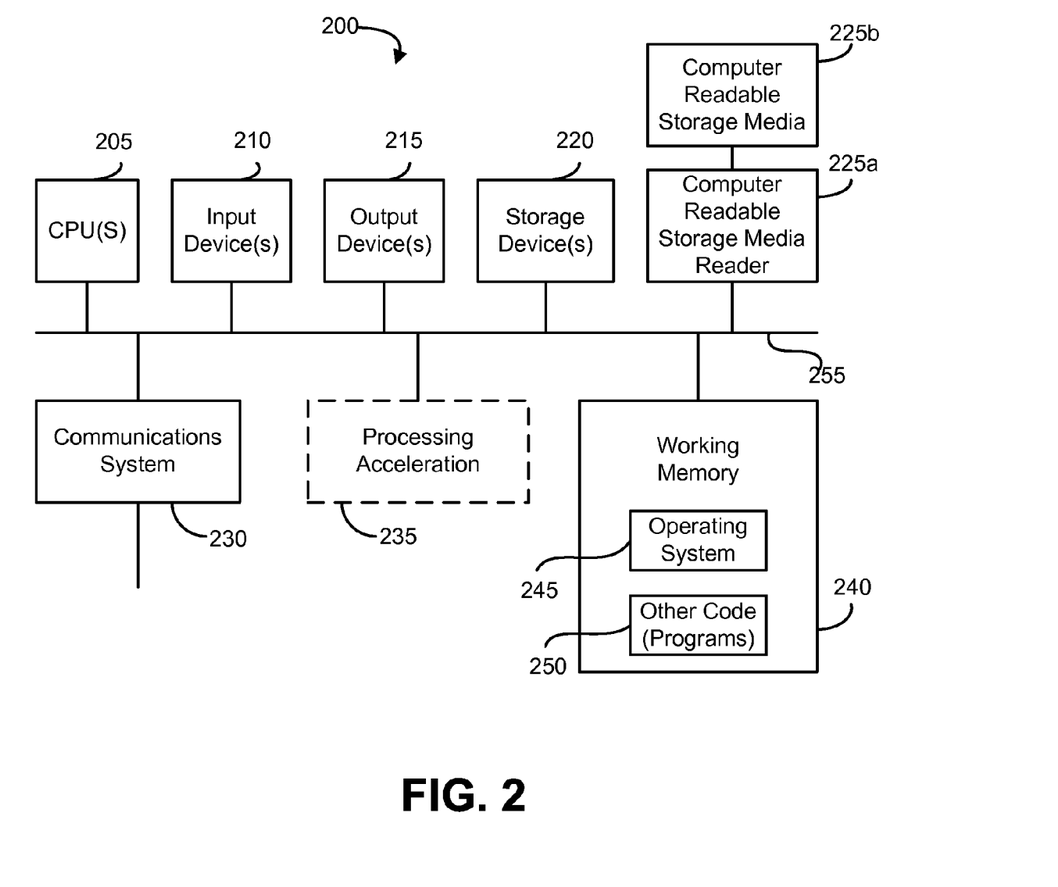
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
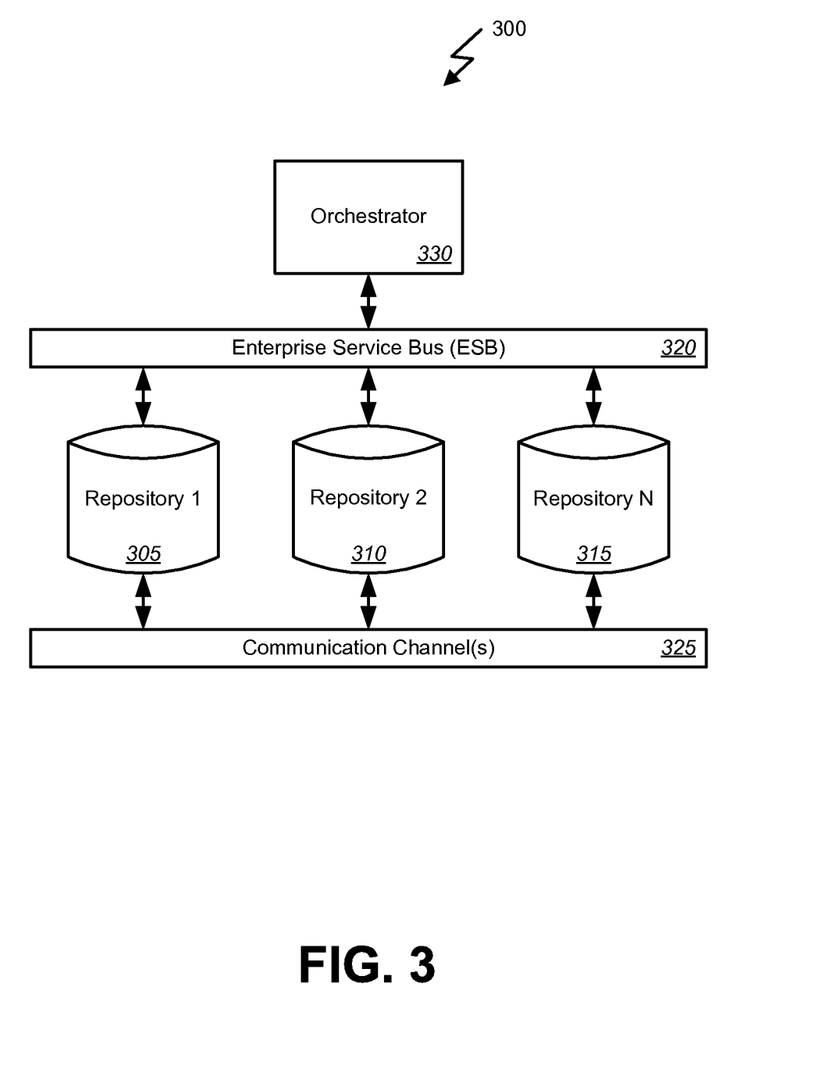
FIG. 3 is a block diagram illustrating, at a high-level, functional components of a system for orchestrating data exchanges and synchronizations between a plurality of databases or other repositories according to one embodiment of the present invention.

FIG. 3 is a block diagram illustrating, at a high-level, functional components of a system for orchestrating data exchanges and synchronizations between a plurality of databases or other repositories according to one embodiment of the present invention. In this example, the system 300 includes an Enterprise Service Bus (ESB) 320 or other Message Oriented Middleware (MOM), message broker, or Event Driven Architecture (EDA) of a Service Oriented Architecture (SOA), one or more communication channels 325 other than the ESB 320, and a number of data repositories 305-315 communicatively coupled with the ESB 320 and the communication channel(s) 325. The plurality of data repositories 305-315 can comprise, for example, a plurality of databases. It should be understood that in some implementations the repositories 305-315 can comprise a distributed database including, for example, a cloud based distributed database, an Infrastructure as a Service (IaaS), etc.

During any of a number of different operations, data can be exchanged between two or more of the repositories 305-315 and/or other elements of the system 300. As noted above, instead of putting all the data to be exchanged on the ESB 320, the instructions to perform the exchange are put on the ESB 320 and the data exchanges are performed between involved repositories via the other communication channels 325. That is, manipulations of the data of an exchange are performed via the ESB 320 but resulting data exchanges are done between involved repositories on the communication channel(s) 325 separate/different from the ESB 320. Further, the system 300 can include an ochestrator 330, e.g., an ochestrator executing or implementing policies or rules defined, for example, in Business Process Execution Language (BPEL). In such a case, the instructions to perform data exchanges or manipulations can be orchestrated by the orchestrator 330 and exchanged via the ESB 320 to affect orchestration of the overall data exchange. The resulting data exchanges can be done between the repositories 305-315 using broadcast, multicast, unicast, multipath, and other means to exchange data via one or more channels 325 other than the ESB 320.

Stated another way, a first data repository 305 can comprise a source of an exchange and a second data repository 310 can comprise a target of the exchange. The first and second data repositories 305 and 310 can be adapted to distinguish instructions to perform a data exchange from data of the resulting data exchange, exchange the instructions to perform the data exchange via the ESB 320 and exchange the data of the data exchange via the communication channel(s) 325. The system 300 can also include an orchestrator 330 communicatively coupled with the ESB 320. The orchestrator 330 can be adapted to orchestrate the data exchange by orchestrating the instructions to perform the data exchange.

As noted, the plurality of data repositories 305 can comprise, for example, a plurality of databases. In such a case, exchanging the data of the resulting data exchange between two or more of the plurality of data repositories comprises performing a database to database exchange. The communication channel 325 can comprise a hardware bus. In this or other cases, exchanging the data of the data exchange between two of more of the plurality of data repositories 305-315 comprises exchanging the data of the data exchange using a broadcast, multicast, unicast, multipath or other exchange.

Figure 4:
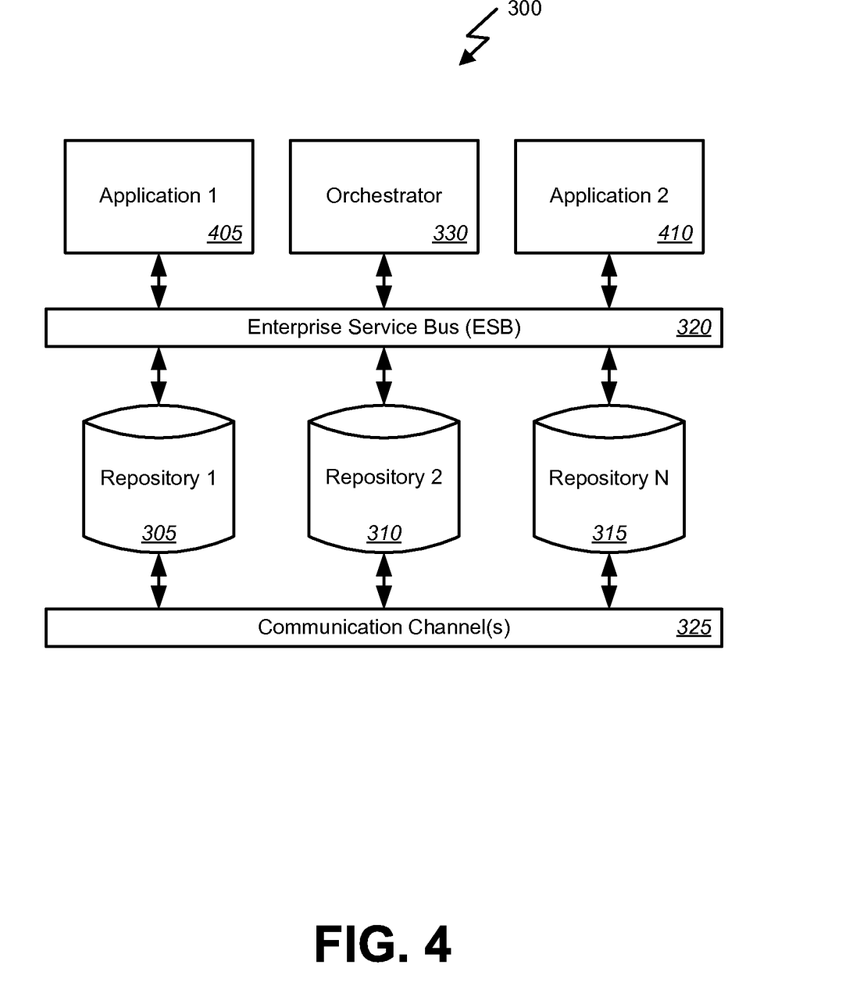
FIG. 4 is a block diagram illustrating, at a high-level, functional components of a system for orchestrating data exchanges and synchronizations between a plurality of databases or other repositories according to another embodiment of the present invention.

FIG. 4 is a block diagram illustrating, at a high-level, functional components of a system for orchestrating data exchanges and synchronizations between a plurality of databases or other repositories according to another embodiment of the present invention. In this example, the system 300 includes the ESB 320, the one or more communication channels 325 other than the ESB 320, and the data repositories 305-315 communicatively coupled with the ESB 320 and the communication channel(s) 325. As illustrated here, the system 300 can further comprise one or more applications 405 and 410 communicatively coupled with the ESB 320. The applications 405 and 410 can participate in the data exchanges to perform any of a variety of different functions or provide any of a variety of different features or services. According to one embodiment, the applications 405 and 410 can participate in the data exchanges based on the instructions to perform the data exchange.

For example, the first data repository 305 can comprise a source of the resulting data exchange. In such a case, the first data repository 305 can be adapted to determine whether the data exchange can be performed between the first data repository 305 and second data repository 310 or whether another element, e.g., orchestrator 330 and/or applications 405 and/or 410 should be involved. The first data repository 305 can be further adapted to perform the resulting data exchange with the second data repository 310 via the communication channel in response to determining the data exchange can be performed between the first data repository 305 and the second data repository 310. In response to determining the resulting data exchange should involve other elements, e.g., application 405, instructions for performing the resulting data exchange can be placed on the ESB 320 to be acted on by the application 405 and/or orchestrator 330.

In some cases, distinguishing the instructions to perform the data exchange from the data of the resulting data exchange can further comprise identifying information indicating a target of the data exchange. In such cases, exchanging the instructions to perform the data exchange via the ESB can comprise exchanging only the information indicating the target of the data exchange. For example when a record by record or larger units of data are to be exchanged, a determination can be made as to whether the exchange can be performed by the source 305. If so, the source 305 can then explicitly send the exchange to the target(s) via the communication channels 325 other than the ESB 320. Again in this case, records that other entities, e.g., applications 405 and/or 410 or orchestrator 330, should examine and consider can be sent on the ESB 320 but other data is exchanged between the repositories 305 and 310 via one or more other communication channels 325. In some cases, especially if larger sets of data are determined to be sent to other entities, e.g., application 405, via the ESB 320, the information sent can be further limited to that data useful to determine the target of the exchange. Then, the interested parties can make a request for the data either via ESB 320 or via the communication channels 325 and exchange data via the communication channels 325.

Figure 5:
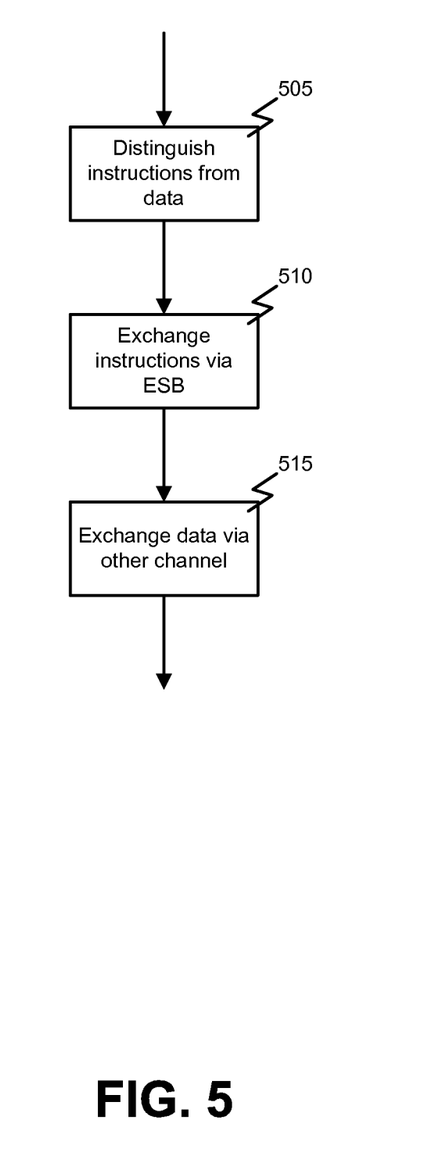
FIG. 5 is a flowchart illustrating a process for orchestrating data exchanges and synchronizations between a plurality of databases or other repositories according to one embodiment of the present invention.

FIG. 5 is a flowchart illustrating a process for orchestrating data exchanges and synchronizations between a plurality of databases or other repositories according to one embodiment of the present invention. In this example, processing begins with distinguishing 505 instructions to perform a data exchange from data of the resulting data exchange. The instructions to perform the data exchange can be exchanged 510 via an ESB of a SOA and the data of the resulting data exchange between two or more of the plurality of data repositories can be exchanged 515 via a channel other than the ESB. As noted above, the data exchange can be orchestrated by orchestrating the instructions to perform the data exchange, i.e., by orchestrating the exchange 510 of instructions.

Figure 6:
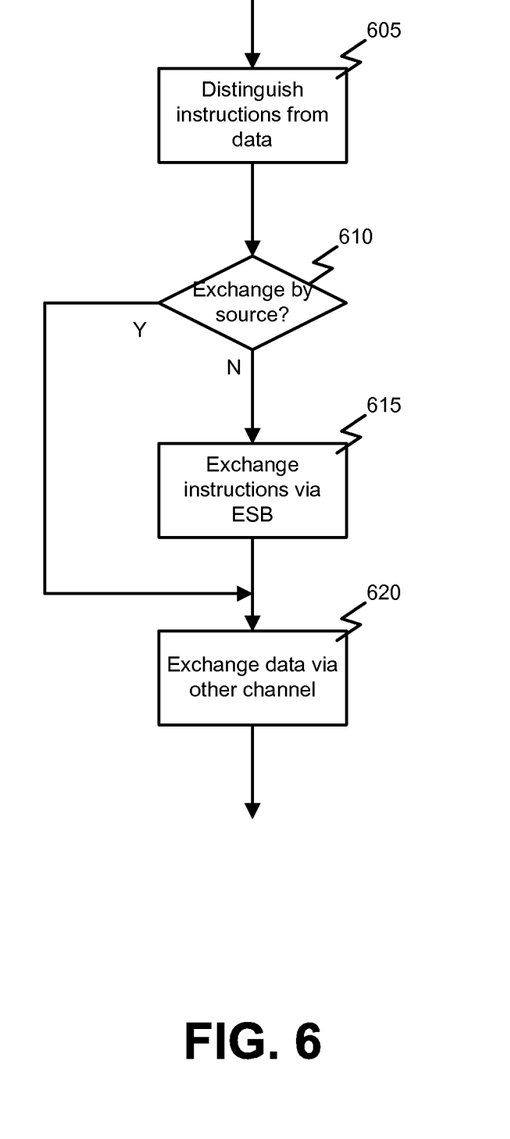
FIG. 6 is a flowchart illustrating additional details of a process for orchestrating data exchanges and synchronizations between a plurality of databases or other repositories according to one embodiment of the present invention.

FIG. 6 is a flowchart illustrating additional details of a process for orchestrating data exchanges and synchronizations between a plurality of databases or other repositories according to one embodiment of the present invention. In this example, processing begins with distinguishing 605 instructions to perform a data exchange from data of the data exchange. A determination 610 can be made as to whether the data exchange can be performed by a source of the data. In response to determining 610 the data exchange can be performed by the source and/or the target of the data, the data exchange from the source of the data to a target of the data exchange can be performed 620 via a channel other than the ESB.

In response to determining 610 the data exchange can not be performed by the source and/or the target of the data, i.e., that other elements should or can be involved in the exchange, the instructions to perform the data exchange can be exchanged 615 via an Enterprise Service Bus (ESB) of a Service Oriented Architecture (SOA) and the data of the data exchange between two or more of the plurality of data repositories can be exchanged 620 via a channel other than the ESB. As noted above, the data exchange can be orchestrated by orchestrating the instructions to perform the data exchange, i.e., by orchestrating the exchange 615 of instructions. In some cases, exchanging 615 the instructions to perform the data exchange can further comprise identifying information indicating a target of the data exchange. In such cases, exchanging 615 the instructions to perform the data exchange via the ESB can comprise exchanging 615 only the information indicating the target of the data exchange.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of synchronizing data between a plurality of databases, the method comprising:
  distinguishing instructions to perform a data synchronization from data of the data synchronization wherein the data synchronization comprises a synchronization from a source database to a target database in a cloud-based distributed database, wherein distinguishing the instructions to perform the data synchronization from the data of the data synchronization further comprises identifying information indicating the target database of the data synchronization as instructions to perform the data synchronization;
  identifying a first subset of the data of the data synchronization, wherein:
    the instructions to perform a data synchronization indicate that the first subset of the data need to be examined by one or more applications as part of the data synchronization;

the source database, the target database, the one or more applications, and an orchestrator process are communicatively coupled to an Enterprise Service Bus (ESB) of a Service Oriented Architecture (SOA); and the source database and the target database are communicatively coupled to a communication channel other than the ESB;

identifying a second subset of the data of the data synchronization, wherein the second subset of the data do not need to be examined by the one or more applications as part of the data synchronization;

orchestrating the data synchronization, by the orchestrator process, by applying one or more policies to the instructions to perform the data synchronization separate from the data of the data synchronization;

exchanging (a) the instructions to perform the data synchronization, and (b) the first subset of the data via the ESB based on the one or more policies applied to the instructions to perform the data synchronization, wherein:

the instructions to perform the data synchronization are exchanged between the source database, the target database, and the orchestration process; and the first subset of the data is exchanged between the source database, the one or more applications, and the target database; and exchanging the second subset of the data of the data synchronization between the source database and the target database via a channel other than the ESB based on the exchanged instructions to perform the data synchronization.

2. The method of claim 1, wherein distinguishing the instructions to perform the data synchronization from the data of the data synchronization further comprises determining based on the information indicating the target database of the data synchronization whether the data synchronization can be performed by the source database of the data.

3. The method of claim 1, wherein the data synchronization comprises performing a database to database exchange.

4. The method of claim 1, wherein the data synchronization comprises exchanging the data of the data synchronization using a broadcast.

5. The method of claim 1, wherein the data synchronization comprises exchanging the data of the data synchronization using a multicast.

6. The method of claim 1, wherein the channel other than the ESB comprises a hardware bus between each of the plurality of databases.

7. A system comprising:
an Enterprise Service Bus (ESB) of a Service Oriented Architecture (SOA);
a communication channel other than the ESB;
a first database of a plurality of databases in a cloud-based distributed database communicatively coupled with the ESB and the communication channel; and
a second database of the plurality of databases in the cloud-based distributed database communicatively coupled with the ESB and the communication channel, wherein, the first and second databases distinguish instructions to perform a data synchronization from data of the data synchronization, wherein distinguishing the instructions to perform the data synchronization from the data of the data synchronization further comprises identifying information indicating a target database of the data synchronization as instructions to perform the data synchronization; and an orchestrator process that is configured to perform operations comprising:

identifying a first subset of the data of the data synchronization, wherein:

the instructions to perform a data synchronization indicate that the first subset of the data need to be examined by one or more applications as part of the data synchronization;

the source database, the target database, the one or more applications, and the orchestrator process are communicatively coupled to the ESB; and the source database and the target database are communicatively coupled to the communication channel other than the ESB;

identifying a second subset of the data of the data synchronization, wherein the second subset of the data do not need to be examined by the one or more applications as part of the data synchronization;

orchestrating the data synchronization by applying one or more policies to the instructions to perform the data synchronization separate from the data of the data synchronization, exchanging only (a) the instructions to perform the data synchronization, and (b) the first subset of the data via the ESB based on the one or more policies applied to the instructions to perform the data synchronization, wherein:

the instructions to perform the data synchronization are exchanged between the source database, the target database, and the orchestration process; and the first subset of the data is exchanged between the source database, the one or more applications, and the target database; and exchanging the second subset of the data of the data synchronization between the source database and the target database via a channel other than the ESB based on the exchanged instructions to perform the data synchronization.

8. The system of claim 7, wherein the first database comprises a source of the data synchronization and is adapted to determine based on the information indicating the target database of the data synchronization whether the data synchronization can be performed between the first database and second database.

9. The system of claim 7, wherein exchanging the data of the data synchronization between two or more of the plurality of databases comprises performing a database to database exchange.

10. The system of claim 7, wherein the data synchronization comprises exchanging the data of the data synchronization using a broadcast.

11. The system of claim 7, wherein the data synchronization comprises exchanging the data of the data synchronization using a multicast.

12. The system of claim 7, wherein the channel other than the ESB comprises a hardware bus between each of the plurality of databases.

13. A non-transitory machine readable memory having stored thereon a series of instructions which, when executed by a processor, cause the processor to synchronize data between a plurality of databases by:

distinguishing instructions to perform a data synchronization from data of the data synchronization wherein the data synchronization comprises a synchronization from a source database to a target database in a cloud-based distributed database, wherein distinguishing the instructions to perform the data synchronization from the data of the data synchronization further comprises identifying information indicating the target database of the data synchronization as instructions to perform the data synchronization;

identifying a first subset of the data of the data synchronization, wherein:
 the instructions to perform a data synchronization indicate that the first subset of the data need to be examined by one or more applications as part of the data synchronization;
 the source database, the target database, the one or more applications, and an orchestrator process are communicatively coupled to an Enterprise Service Bus (ESB) of a Service Oriented Architecture (SOA); and
 the source database and the target database are communicatively coupled to a communication channel other than the ESB;

identifying a second subset of the data of the data synchronization, wherein the second subset of the data do not need to be examined by the one or more applications as part of the data synchronization;

orchestrating the data synchronization, by the orchestrator process, by applying one or more policies to the instructions to perform the data synchronization separate from the data of the data synchronization;

exchanging (a) the instructions to perform the data synchronization, and (b) the first subset of the data via the ESB based on the one or more policies applied to the instructions to perform the data synchronization, wherein:
 the instructions to perform the data synchronization are exchanged between the source database, the target database, and the orchestration process; and
 the first subset of the data is exchanged between the source database, the one or more applications, and the target database; and exchanging the second subset of the data of the data synchronization between the source database and the target database via a channel other than the ESB based on the exchanged instructions to perform the data synchronization.

14. The non-transitory machine readable memory of claim 13, wherein distinguishing the instructions to perform the data synchronization from the data of the data synchronization further comprises determining based on the information indicating the target database of the data synchronization whether the data synchronization can be performed by the source database of the data.

15. The non-transitory machine readable memory of claim 13, wherein the data synchronization comprises exchanging the data of the data synchronization using a broadcast.

16. The non-transitory machine readable memory of claim 13, wherein the data synchronization comprises exchanging the data of the data synchronization using a multicast.

17. The non-transitory machine readable memory of claim 13, wherein the channel other than the ESB comprises a hardware bus between each of the plurality of databases.

* * * * *

UNITED STATES PATENT AND TRADEMARK OFFICE
CERTIFICATE OF CORRECTION

PATENT NO. : 9,535,769 B2  
APPLICATION NO. : 13/022002  
DATED : January 3, 2017  
INVENTOR(S) : Maes Page 1 of 1

It is certified that error appears in the above-identified patent and that said Letters Patent is hereby corrected as shown below:

In the Specification

In Column 4, Line 52, delete "repostories." and insert -- repositories. --, therefor.

In Column 8, Line 17, delete "repostories" and insert -- repositories --, therefor.

In Column 8, Line 22, delete "ochestrator" and insert -- orchestrator --, therefor.

In Column 8, Line 23, delete "ochestrator" and insert -- orchestrator --, therefor.

In the Claims

In Column 12, Line 23, in Claim 7, after "exchanging" delete "only".

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*